United States Patent
Dobbie et al.

(10) Patent No.: US 8,648,897 B2
(45) Date of Patent: Feb. 11, 2014

(54) SYSTEM AND METHOD FOR DYNAMICALLY ENHANCING DEPTH PERCEPTION IN HEAD BORNE VIDEO SYSTEMS

(75) Inventors: Blair Reuben Dobbie, Roanoke, VA (US); Charles Dale Willey, Roanoke, VA (US); Thurmon E. Lockhart, Blacksburg, VA (US)

(73) Assignee: Exelis, Inc., McLean, VA (US)

( * ) Notice: Subject to any disclaimer, the term of this patent is extended or adjusted under 35 U.S.C. 154(b) by 564 days.

(21) Appl. No.: 12/861,988

(22) Filed: Aug. 24, 2010

(65) Prior Publication Data

US 2011/0043616 A1 Feb. 24, 2011

Related U.S. Application Data

(63) Continuation-in-part of application No. 11/545,644, filed on Oct. 10, 2006, now Pat. No. 8,130,261.

(51) Int. Cl.
*H04N 13/04* (2006.01)

(52) U.S. Cl.
USPC .......... 348/51; 348/53; 348/61; 348/43; 348/46

(58) Field of Classification Search
USPC .................. 348/51, 53, 61, 43, 46
See application file for complete search history.

(56) References Cited

U.S. PATENT DOCUMENTS

| | | | |
|---|---|---|---|
| 5,173,726 A | 12/1992 | Burnham et al. | |
| 5,500,671 A | 3/1996 | Andersson et al. | |
| 5,787,313 A | 7/1998 | Compton et al. | |
| 5,815,746 A | 9/1998 | Masuda | |
| 5,978,015 A * | 11/1999 | Ishibashi et al. | 348/47 |
| 6,177,952 B1 * | 1/2001 | Tabata et al. | 348/47 |
| 6,307,526 B1 * | 10/2001 | Mann | 345/8 |
| 6,560,029 B1 * | 5/2003 | Dobbie et al. | 359/631 |
| 7,116,491 B1 | 10/2006 | Willey et al. | |
| 2006/0250322 A1 * | 11/2006 | Hall et al. | 345/8 |
| 2008/0084472 A1 | 4/2008 | Trudeau et al. | |

FOREIGN PATENT DOCUMENTS

CN 2665738 Y 12/2004

OTHER PUBLICATIONS

International Application Serial No. PCT/US2011/048889, International Search Report and Written Opinion mailed Nov. 2, 2011, 9 pgs.
Examiner, Chinese Patent Office (SIPO), First Office Action for Patent Application No. CN 200710180936.7, Jan. 6, 2011.

* cited by examiner

*Primary Examiner* — Shawn An
(74) *Attorney, Agent, or Firm* — Ratnerprestia

(57) ABSTRACT

Systems and methods for viewing image data. The system includes a head borne image source, a controller, an eyepiece lens assembly and a display device. The head borne image source images an object and provides the image data. The controller determines a focus adjustment from a focus position of the head borne image source. The display device receives and displays the image data to a user's eye via the eyepiece lens assembly. A distance between the eyepiece lens assembly and the display device is adjusted based on the focus adjustment responsive to the focus position.

17 Claims, 12 Drawing Sheets

SYSTEM AND METHOD FOR DYNAMICALLY ENHANCING DEPTH PERCEPTION IN HEAD BORNE VIDEO SYSTEMS

CROSS REFERENCE TO RELATED APPLICATIONS

This application is a continuation in part of U.S. Nonprovisional application Ser. No. 11/545,644 filed on Oct. 10, 2006 entitled A SYSTEM AND METHOD FOR DYNAMICALLY CORRECTING PARALLAX IN HEAD BORNE VIDEO SYSTEMS, the contents of which are incorporated herein by reference.

FIELD OF THE INVENTION

The present invention relates, in general, to systems and methods for viewing image data. More specifically, the present invention relates to systems and methods for displaying image data, in a head borne imaging system, which adjusts a focus of an eyepiece lens assembly based on a focus position of an image source.

BACKGROUND OF THE INVENTION

Vision aid devices which are worn on the head are typically located directly in front of the aided eye or eyes. As these systems migrate from direct view optical paths to digital camera aids, the system configuration requires that a head mounted display (HMD) be placed directly in front of the user's aided eye, with one inch of eye relief. This placement of the HMD prevents the co-location of the camera aperture directly in front of the aided eye. The camera aperture must be moved either in front of the HMD or to one side of the HMD.

If, for example, the digital camera is placed 100 mm to the side of the optical axis of the aided eye, then a displacement is created between the aperture of the digital camera and the image display of the digital camera, the display typically centered about the optical axis of the aided eye. This displacement creates a disparity between the apparent positions of objects viewed through the camera, and the actual positions of the objects seen in object space (or real space). This offset in perceived space and object space is referred to as parallax.

FIG. 1 provides an example of parallax error. As shown, the user is viewing environment 10 through a head mounted video device. The user sees tool 12 at close range and attempts to pick up the tool. Because of parallax, the perceived position of tool 12 is incorrect. The true position of tool 12 in object space shown by dotted tool 14.

In the case of the user viewing an object through a head mounted video device, parallax reduces the usefulness of the video system. The human psycho-visual system is unconsciously attuned to perceiving the world through its natural entrance aperture, which is the pupil in the human eye. The hand-to-eye coordination inherent in manual tasks is based on this innate property. Normal human movement tasks, such as walking and running, depend on this subconscious process. A fixed system, which is aligned to remove parallax at some fixed distance, is miss-aligned at all other distances. This is especially true when the video system is aligned to remove parallax of an object at far range and the user attempts to locate another object at close range, such as tool 12 on FIG. 1 which is located within an arms length of the user.

As will be explained, the present invention addresses the parallax problem by providing a system for dynamically realigning the video image so that the image coincides with the real world at all distances.

As described above, the human psycho-visual system is unconsciously attuned to perceiving the world through the pupil of the human eye. The removal of parallax places the imaged object at the natural eye convergence angle. The eye convergence angle, however, is just one cue for providing depth perception of an object viewed through the camera. Another cue for depth perception is the unconscious accommodation of both of the user's unaided eyes to focus on objects of interest at different distances, in concert with the convergence of the eyes' lines of sight. The present invention addresses the simulation of depth perception cues by providing a system for simulating the object distance to the eye of the user so that the image presented to the eye appears to be at the same distance as the real object.

SUMMARY OF THE INVENTION

To meet this and other needs, and in view of its purposes, the present invention provides a dynamically corrected parallax system including a head borne video source for imaging an object and providing video data. A controller is included for electronically offsetting the video data provided from the head borne video source to form offset video data. A display device receives the offset video data and displays the offset video data to a user's eye. The display device is configured for placement directly in front of the user's eye as a vision aid, and the head borne video source is configured for displacement to a side of the user's eye. The offset video data corrects parallax due to displacement between the display device and the head borne video source.

The display device includes an X,Y array of respective columns and rows of pixels, and the offset video data includes an offset of a number of columns of pixels in the X direction of the X,Y array. The offset video data, alternatively, may include an offset of a number of rows of pixels in the Y direction of the X,Y array. The offset video data may also include an offset of a number of columns of pixels in the X direction of the X,Y array and another offset of a number of rows of pixels in the Y direction of the X,Y array.

Geometrically, the optical axis of the user's eye extends a distance of D to an object imaged by the video source, and an optical axis of the aperture of the video source extends in a direction parallel to the optical axis of the user's eye. The displacement to a side is a horizontal displacement distance of d in a Frankfort plane between the optical axis of the user's eye and the optical axis of the aperture of the video source. The offset video data is based on the horizontal displacement distance d and the distance D to the object.

Furthermore, a horizontal offset angle $\theta_D$ is formed, as follows:

$$\theta_D = t_{an}^{-1} d/D,$$

where d is a horizontal displacement distance between the optical axis of the user's eye and the optical axis of the aperture of the video source.

The display device includes an X,Y array of respective columns and rows of pixels, and the offset video data includes the following horizontal offset:

$$\text{offset}_{columns} = \#\text{Columns}/\text{FOV}_{horz} * \theta_D$$

where $\text{offset}_{columns}$ is the amount of horizontal offset in columns, $\text{FOV}_{horz}$ is the horizontal field-of-view of the video source, and #Columns is the total number of columns of the display device.

Further yet, a vertical offset angle $\theta_D$ may also be formed, where $$\phi_D = t_{an}^{-1} d'/D,$$

where d' is a vertical displacement distance between the optical axis of the user's eye and the optical axis of the aperture of the video source. The offset video data includes the following vertical offset:

$$\text{offset}_{rows} = \#\text{Rows}/\text{FOV}_{vert} * \phi_D$$

where $\text{offset}_{rows}$ is the amount of vertical offset in rows, $\text{FOV}_{vert}$ is the vertical field-of-view of the video source, and #Rows is the total number of rows in the display device.

The dynamically corrected parallax system includes a display electronics module disposed between the video source and the display device for converting the video data from the video source into digital video data. The display electronics module is configured to receive an offset command from the controller and modify the digital video data into the offset video data. The display electronics module and the controller may be integrated in a single unit. A focus position encoder may be coupled to the controller for determining a distance D to an object imaged by the video source, where the distance D is used to correct the parallax.

The display device may be a helmet mounted display (HMD), or part of a head mounted night vision goggle.

Another embodiment of the present invention includes a dynamically correcting parallax method for a head borne camera system having a video source and a display device, where the display device is configured for placement directly in front of a user's eye as a vision aid, and the video source is configured for displacement to a side of the user's eye. The method includes the steps of: (a) imaging an object, by the video source, to provide video data; (b) determining a focus distance to an object; (c) offsetting the video data to form offset video data based on the focus distance determined in step (b) and a displacement distance between the user's eye and an aperture of the video source; and (d) displaying the offset video data by the display device.

A further embodiment of the present invention includes a system for viewing image data. The system includes a head borne image source for imaging an object and providing the image data, a controller for determining a focus adjustment from a focus position of the head borne image source, an eyepiece lens assembly and a display device for receiving the image data and displaying the image data to a user's eye via the eyepiece lens assembly. A distance between the eyepiece lens assembly and the display device is adjusted based on the focus adjustment responsive to the focus position.

Another embodiment includes a method of viewing image data for a head borne camera system having an image source, a display device and an eyepiece lens assembly. The method includes the steps of: (a) imaging an object, by the image source, to provide the image data; (b) determining a focus adjustment based on a focus position of the image source; (c) adjusting a distance between the eyepiece lens assembly and the display device based on the focus adjustment determined in step (b); and (d) displaying the image data to a user's eye by the display device via the eyepiece lens assembly, responsive to step (c).

It is understood that the foregoing general description and the following detailed description are exemplary, but are not restrictive, of the invention.

BRIEF DESCRIPTION OF THE DRAWING

The invention is best understood from the following detailed description when read in connection with the accompanying drawings. Included in the drawing are the following figures.

DETAILED DESCRIPTION OF THE INVENTION

As will be explained, the present invention dynamically realigns the video image so that the image coincides with the real world at all distances. To do this, the present invention determines the range to the object of interest, so that dynamic alignment may be accomplished based on the determined range. In one embodiment, the invention uses an absolute position of the camera's focus mechanism (or angular orientation of a manual focus knob) to determine the distance to the user's object-of-interest and then applies an appropriate amount of parallax correction to the image shown on the user's display. In this manner, the apparent location of an object-of-interest is correctly perceived at its true position in object space.

In one embodiment of the invention, the video is provided to the user on a digital display device, such as a LCD or LED display. These displays consist of an array of rows and columns of pixels. By controlling the timing of the video data sent to the display, the present invention induces an offset in the image as the image is displayed to the user. By shifting the image in display space, the present invention removes the disparity between the apparent position of an object and its actual position in object space.

A consequence of shifting the image on the display is lost rows and/or columns of pixels in the direction of the image shift. Rows and/or columns of pixels on the opposite edges of the display show arbitrary intensity values, because (assuming a one-to-one relationship in pixel resolution between the camera and the display) these pixels are no longer within the field-of-view of the camera and, therefore, do not provide image data. Thus, shifting the image introduces a reduction in the effective user's field-of-view, because of the reduced usable image size. This negative effect may be minimized, however, by setting the camera pointing angle for convergence at a distance much closer than the far field.

Figure 1:
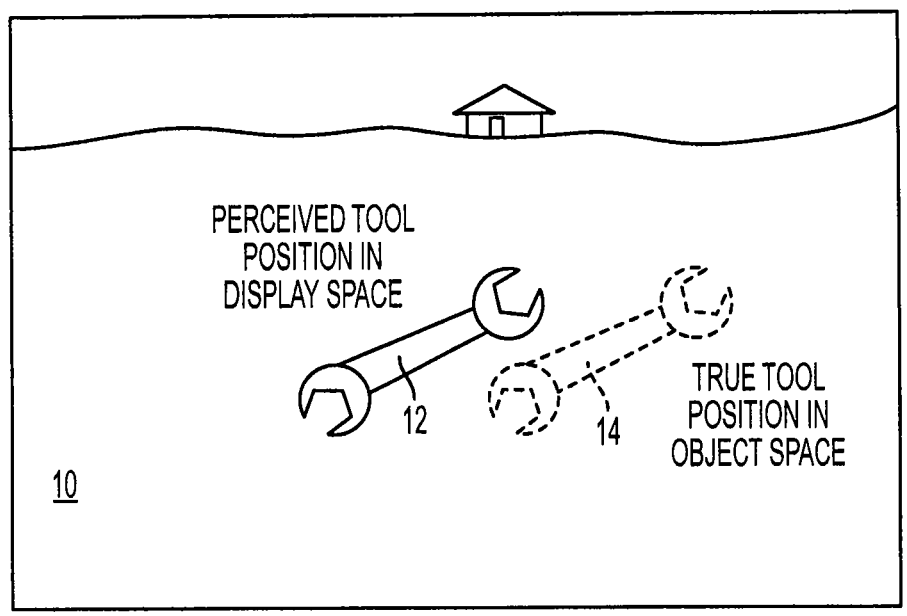
FIG. 1 depicts a geometry of a parallax offset between an object as imaged by a camera and the same object as seen in object space by a viewer.
Figure 2:
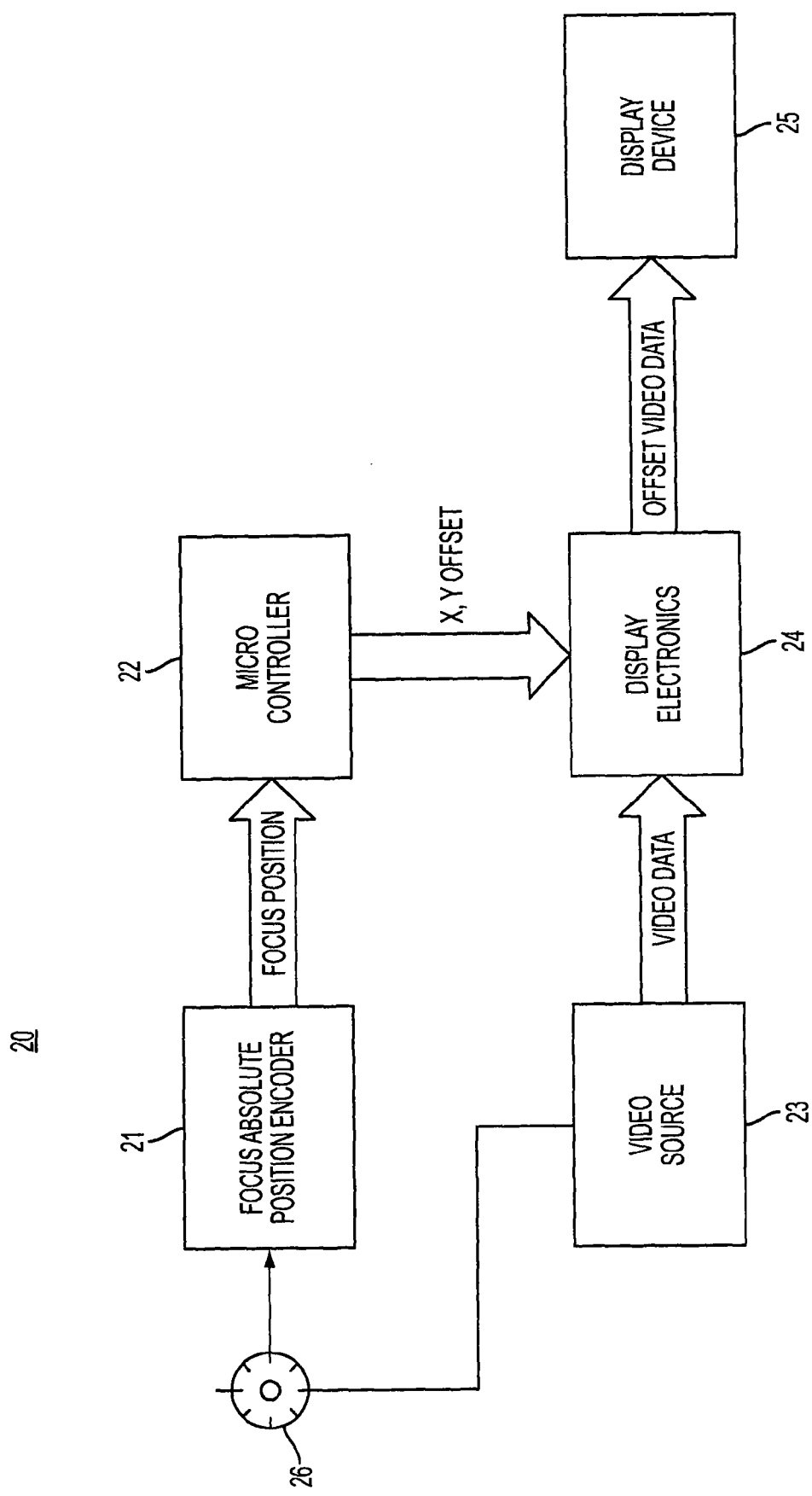
FIG. 2 is a block diagram of a system for dynamically correcting parallax in a head borne video system, in accordance with an embodiment of the present invention.

Referring next to FIG. 2, there is shown a system for dynamically correcting parallax in a head borne video system, generally designated as 20. System 20 includes video source 23 providing video data to display electronics module 24, the latter forming digital pixel data for viewing on display device 25. Also included in system 20 is a focus position encoder, designated as 21, for providing focus position data to microcontroller 22. The focus position encoder 21 encodes, as shown, the orientation of focus knob 26 disposed on video source 23. Microcontroller 22 converts the focus position data received from the position encoder 21 into X,Y offset control signals, as will be explained later. The X,Y offset control signals are provided to display electronics 24 which, in turn, provides the offset video data for viewing on display device 25.

It will be appreciated that video source 23 may be any camera device configured to be placed on the side of the optical axis of a user's eye. In the embodiment shown in FIG. 2, video source 23 includes manual focus knob 26 which allows the user to adjust the lens of the video camera to focus on an object-of-interest. Display device 25 may be any display which is configured to be placed about the optical axis of the user's eye. The display device provides an offset pixel image of the image represented by the video data received from video source 23. The X,Y array of pixels displayed on display device 25 and the video data provided by video source 23 may have a one-to-one correspondence, or may have any other relationship, such as a correspondence resulting from a reduced resolution display versus a high resolution video camera.

As another embodiment, focus knob 26 may be controlled by a motor (not shown) to allow for a zoom lens operation of video source 23. In this embodiment, focus position encoder 21 may determine the focal length to an object-of-interest by including a zoom lens barrel. A focal length detecting circuit may be included to detect and output the focal length of the zoom lens barrel. As a further embodiment, video source 23 may include a range finder, such as an infrared range finder, which may focus an infrared beam onto a target and receive a reflected infrared beam from the target. A position sensitive device included in focus position encoder 21 may detect the displacement of the reflected beam and provide an encoded signal of the range, or position of the target.

The microcontroller may be any type of controller having a processor execution capability provided by a software program stored in a medium, or a hardwired program provided by an integrated circuit. The manner in which microcontroller 22 computes the X,Y offset control signals is described next.

Figure 3A:
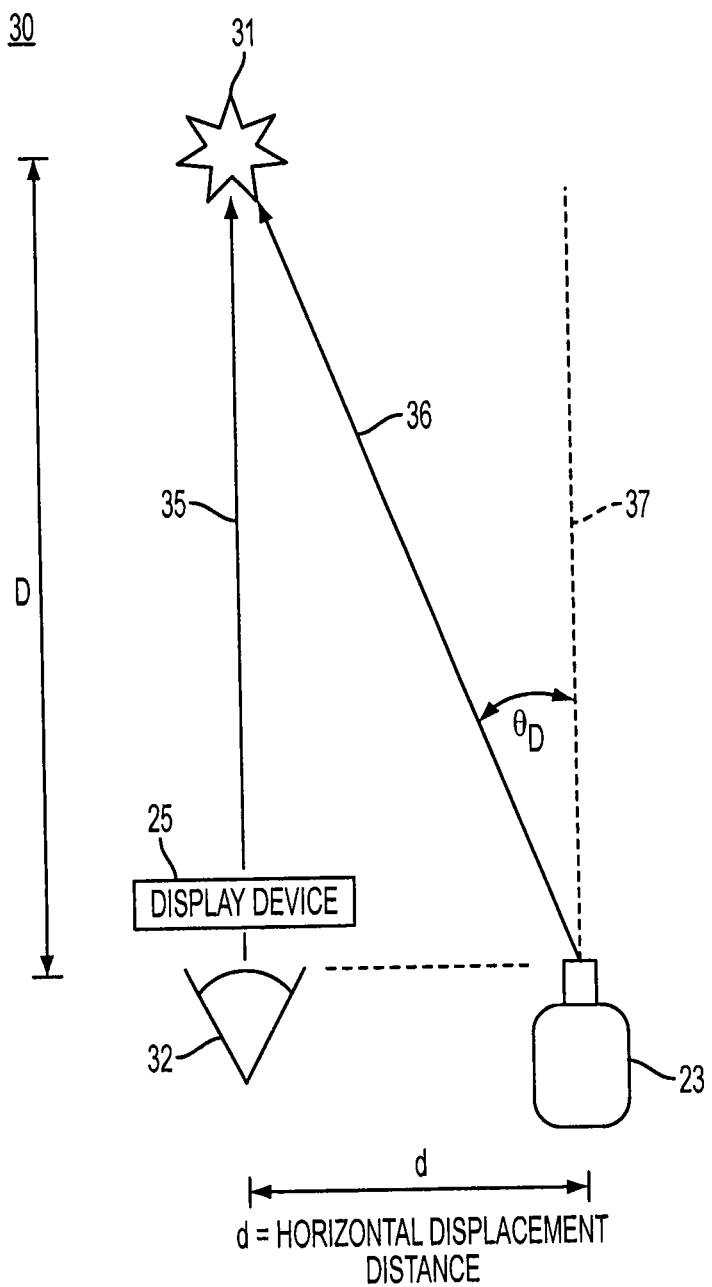
FIG. 3A is a top view of an object as viewed by a user and imaged by a video camera, where a display of the image is displaced from the aperture of the camera by a horizontal displacement distance.
Figure 3B:
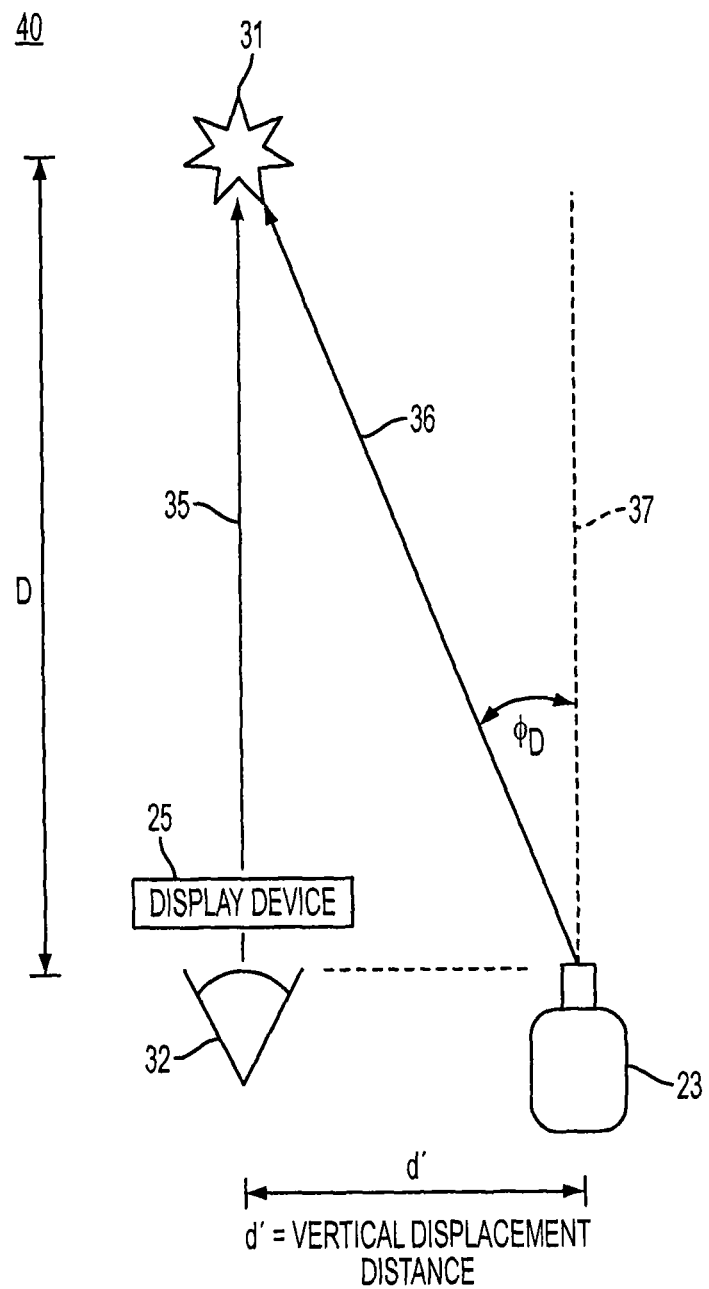
FIG. 3B is a side view of an object as viewed by a user and imaged by a video camera, where a display of the image is displaced from the aperture of the camera by a vertical displacement distance.

Referring to FIGS. 3A and 3B, camera 23 is shown offset by a displacement distance from a user's eye 32. FIGS. 3A and 3B are similar to each other, except that camera 23 is oriented to a horizontal, right side of a user's eye 32 by a horizontal displacement distance of d in FIG. 3A, whereas it is oriented to a vertical side of (above or below) the user's eye by a vertical displacement distance of d' in FIG. 3B. The horizontal displacement distance and/or the vertical displacement distance is typically in the vicinity of 100 millimeters. The camera 23 has an optical axis designated as 37 and the user's eye has an optical axis designated as 35. Both optical axes are shown parallel to each other.

The user is aided in the viewing of object 31 by way of display device 25. As shown in FIG. 3A, camera 23 is imaging object 31 at a horizontal offset angle of $\theta_D$. In FIG. 3B, however, camera 23 is imaging object 31 at a vertical offset angle of $\phi_D$. In both figures, object 31 is displayed as a pixel image on display device 25 for viewing by the user. The focal distance, which may be adjustable, is the distance D between the user's eye and the object-of-interest 31.

Using FIG. 3A, a method for calculating the X offset control signal by microcontroller 22 is exemplified below. In this example, the units of the X offset are in horizontal pixels, which may be equivalent to columns of pixels on video display 25. For the purpose of this example, it is assumed that the horizontal displacement distance d is 103 mm; the field-of-view (FOV) of camera 23 is 40 degrees along the to horizontal (HFOV) axis; the horizontal resolution of display device 25 is 1280 pixels; the optical axis of camera 23 is parallel to the optical axis of the unaided eye 32; the aperture of the camera is on the viewer's Frankfort plane, in line with the unaided eye; and the object-of-interest 31 is at a focal distance of D.

The horizontal offset angle $\theta_D$ is given by equation (1) as follows $$\theta_D = t_{an}^{-1} d/D \quad \text{(Eq. 1)}$$

The correction factor '$C_{horz}$' (for a 40 degree FOV and a 1280 pixel horizontal display resolution) is given by equation 2, in units of columns per degree, as follows $$C_{horz} = \# \text{ Columns}/FOV_{horz} \quad \text{(Eq. 2)}$$
$$= 1280/40$$
$$= 32 \text{ columns/degree}$$

Here, #columns is the total number of columns in the digital display, or 1280 columns (in this example). The image shift on the display device, or the amount of offset-in-columns, is given by equation 3 below, where $\theta_D$ is the horizontal offset angle between the camera's line of sight 36 and the camera's optical axis 37.

$$\text{offset}_{columns} = C_{horz} * \theta_D \quad \text{(Eq. 3)}$$

In a similar manner, using FIG. 3B, a method for calculating the Y offset control signal by microcontroller 22 is exemplified below. In this example, the units of the Y offset are in vertical pixels, which may be equivalent to rows of pixels on video display 25. For the purpose of this example, it is assumed that the vertical displacement distance d' is 103 mm; the field-of-view (FOV) of camera 23 is 30 degrees along the vertical (VFOV) axis; the vertical resolution of display device 25 is 1024 pixels; the optical axis of camera 23 is parallel to the optical axis of the unaided eye 32; the aperture of the camera is in a vertical line with the unaided eye; and the object-of-interest 31 is at a focal distance of D.

The vertical offset angle $\phi_D$ is given by equation (4) as follows $$\phi_D = t_{an}^{-1} d''_D \quad \text{(Eq. 4)}$$

The correction factor $C_{vert}$ (for a 30 degree vertical FOV and a 1024 pixel vertical display resolution) is given by equation 5, in units of rows per degree, as follows $$C_{vert} = \# \text{ Rows}/FOV_{vert} \quad \text{(Eq. 5)}$$
$$= 1024/30$$
$$= 34 \text{ rows/degree}$$

Here, #rows is the total number of rows in the digital display, or 1024 rows (in this example). The image shift on the display device, or the amount of offset-in-rows, is given by equation 6 below, where $\phi_D$ is the vertical offset angle between the camera's line of sight 36 and the camera's optical axis 37.

$$\text{Offset}_{rows} = C_{vert} * \phi_D \quad \text{(Eq. 6)}$$

Figure 4:
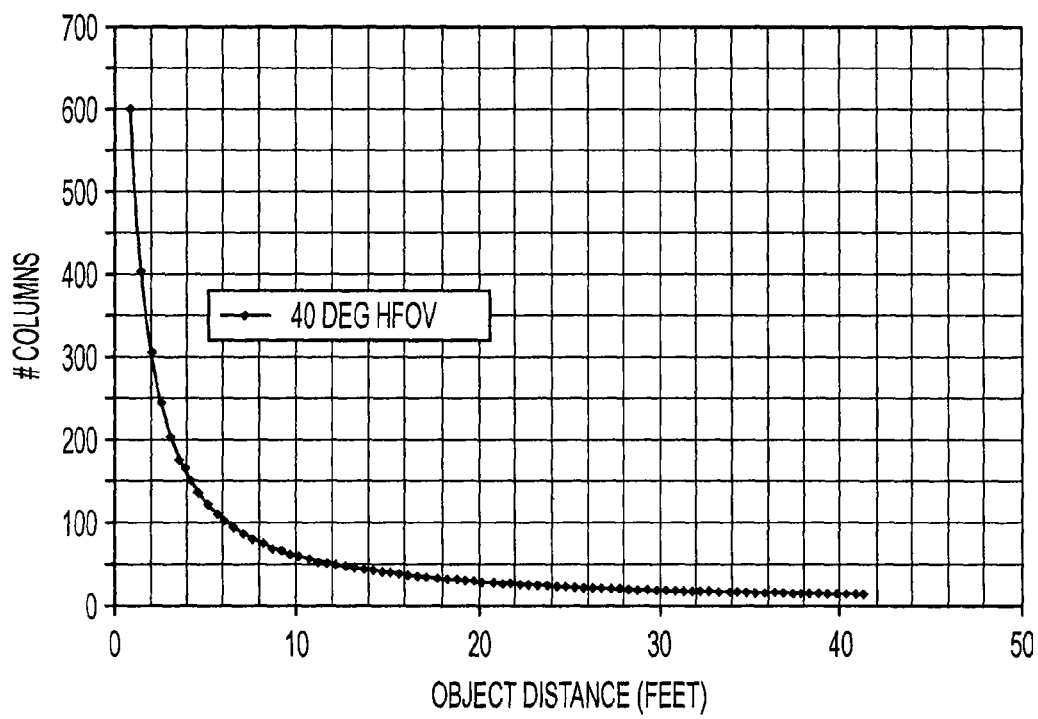
FIG. 4 is a plot of the number of columns required to be shifted on a display as a function of viewing distance to the object-of-interest, in accordance with an embodiment of the present invention.

Referring next to FIG. 4, there is shown a plot of the offset-in-#columns vs the distance between the observer (the user's eye) and the observed object (object-of-interest). More specifically, FIG. 4 plots the horizontal image offset, in number-of-columns, required to compensate for the parallax induced by a 103 mm horizontal displacement between an observer and the video camera. For a camera located to the right of the aided eye, the parallax correcting image shift in the display is towards the right.

The plot shown in FIG. 4 is for a camera/HMD system with a matched HFOV of 40 degree. As can be seen, the amount of image shift required to remove the parallax increases nonlinearly as the observer focuses to shorter and shorter distances. At a focus distance of 2 feet, 25% of the viewable area of a SXGA high resolution display will be shifted out of view, thereby reducing the effective display HFOV by approximately 25%. To avoid the loss of HFOV at close focus distances, the optical axis of the camera may be biased to the left, thereby reducing the horizontal offset angle $\theta_D$.

A similar plot to the plot shown in FIG. 4 may be made for an offset-in-#rows vs the distance between the observer (the user's eye) and the observed object (object-of-interest).

Figure 5:
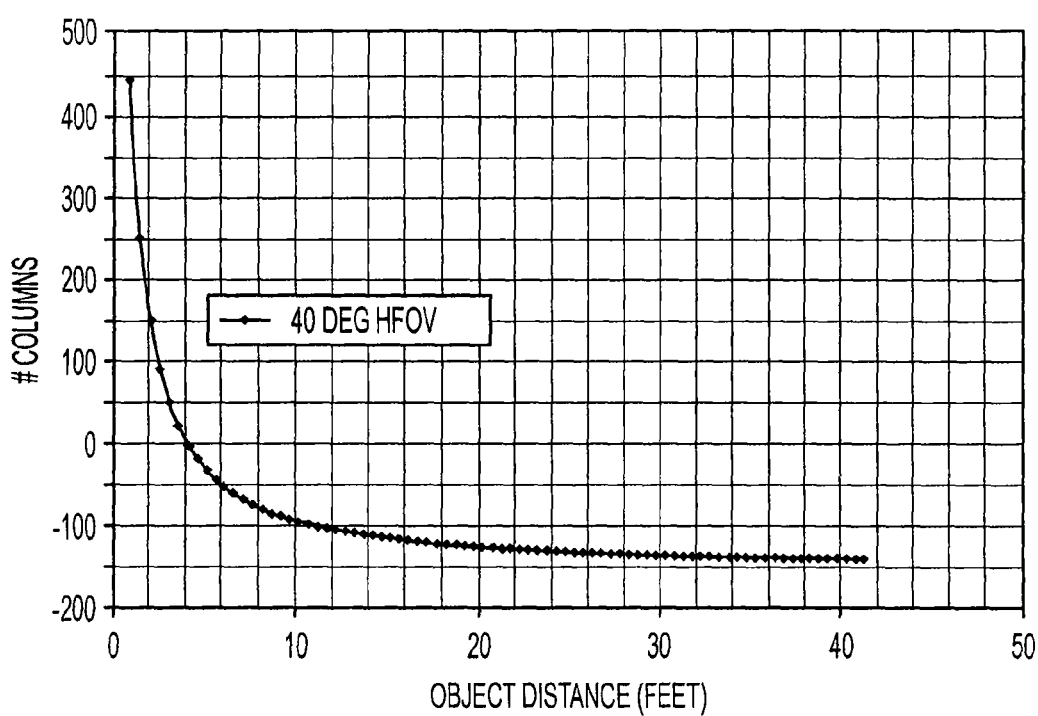
FIG. 5 is a plot of the number of columns required to be shifted on a display as a function of viewing distance to the object-of-interest, with a bias angle introduced in the imaging angle of the camera, in accordance with an embodiment of the present invention.

Lastly, FIG. 5 shows a resulting horizontal image offset in #columns with the same assumptions as those made for FIG. 4, except that a bias angle of 4.8 degrees has been introduced. At this camera angle, the display offset required to remove parallax is reduced to zero at 4 feet. At 2 feet, the required offset is 152 columns, or 12% of the HFOV, as compared to 24% of the HFOV in FIG. 4. Beyond a distance of 4 feet, the display offset becomes negative, which means that the video image must be shifted toward the opposite edge, or end of the display. This camera angle thus introduces a parallax error with an opposite sign. For a focal distance of 10 feet, the horizontal display offset required to compensate for parallax is −93 columns, or 7.2% of the HFOV. At 40 feet distance, the horizontal display offset is 139 columns, or 11% of the HFOV.

As described above, the exemplary system 20 (FIG. 2) corrects for parallax by inducing an offset in the image as the image is displayed to the user. This image offset places the image of the object at its actual position (i.e., actual field angle) in object space, such that the image of the object is placed at the natural eye convergence angle. By correcting for parallax, the image offset also corrects for an error in the natural eye convergence angle.

Typically, in a visual aid system such as night vision goggle, images provided to a viewer may not be an entirely accurate reproduction of the imaged scene. For example, the placement of the entrance aperture of the visual aid may not be at the entrance aperture of the user's eye. The displacement of the entrance aperture of the visual aid may produce unwanted perceptual effects on the user, who is innately conditioned to the entrance aperture of the eye's iris. The displacement of the entrance aperture may affect both in-line visual aids (where the image source aperture is co-located with the optical axis of the aided eye) and offset visual aids (where the image source aperture is offset from the optical axis of the aided eye).

As described above, in offset visual aid systems, by correcting parallax, the image offset also corrects the natural eye convergence angle. The eye convergence angle is only one cue for depth perception. Another cue relates to the unconscious accommodation of the divergence of the lines of sight of the eye to objects at different distances, i.e., the focus of the user's eyes. One method for simulating the eye's focus is by adjusting the focus of an eyepiece lens. Conventional vision aid devices typically include an eyepiece lens that is manually adjustable by the user. However, the conventional eyepiece focus is not adjusted in connection with other depth perception cues.

According to another embodiment of the present invention, the focus of the eyepiece is ganged to the focus of the image source. An objective lens of the image source is positioned to focus on an object of interest. The focus position is detected and used to determine a distance to the object. An eyepiece lens adjustment is determined based on the distance to the object. The eyepiece lens adjustment simulates the divergence of the eye lines of sight so that the imaged object appears to be at the same distance as the real object. Accordingly, the focus of the image source also controls the eyepiece focus position. The focus adjustment drives the eyepiece lens to a position that results in the object image being presented to the user's eye at the same effective focus as the object would appear in the absence of the visual aid system.

Figure 6:
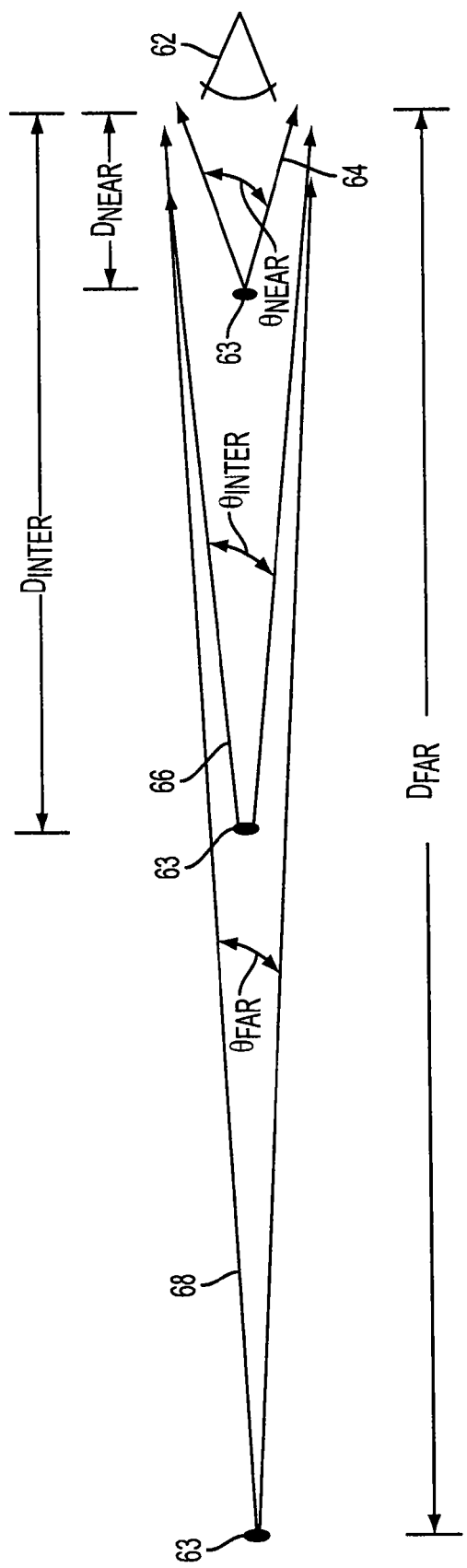
FIG. 6 is a side view of an unaided eye relative to an object illustrating the eye lines of sight to the object when the object is positioned at various distances to the unaided eye.

Referring next to FIG. 6, the unconscious focus of an unaided eye 62 for an object 63 at different focal distances $D_{NEAR}$, $D_{INTER}$, $D_{FAR}$ is explained. In FIG. 6, focal distance $D_{NEAR}$ represents an object near to eye 62, focal distance $D_{INTER}$ represents an object at an intermediate distance to eye 62 and focal distance $D_{FAR}$ represents an object far from eye 62.

As a first example, when eye 62 observes object 63 that is at near focal distance $D_{NEAR}$, the near lines of sight 64 converge on object 63 at angle $\theta_{NEAR}$ and the eye lens unconsciously focuses on the object 63. As a second example, when eye 62 observes object 63 at intermediate focal distance $D_{INTER}$, the intermediate lines of sight 66 converge on object 63 at angle $\theta_{INTER}$ and the eye lens unconsciously focuses on the object 63. As a third example, when eye 62 observes object 63 at far focal distance $D_{FAR}$, the far lines of sight 68 converge on object 63 at angle $\theta_{FAR}$ and the eye lens unconsciously focuses on the object 63. At far focal distance $D_{FAR}$, the far lines of sight 68 are substantially parallel and the eye is relaxed to a near infinity focus. The angle $\theta$ is associated with the divergence of the eye lines of sight for various distances from object 63 to eye 62. It can be appreciated that angle $\theta$ increases as the distance to object 63 decreases, such that $\theta_{NEAR} > \theta_{INTER} > \theta_{FAR}$.

The human viewer unconsciously focuses on object 63 at various distances by varying the shape of the lens of unaided eye 62 in a process called accommodation. In general, a lens of unaided eye 62 changes shape to change the divergence of the eye lines of sight and bring object 63 into focus for various focal distances. For example, object 63 at near distance $D_{NEAR}$ uses more accommodation to bring object 63 into focus at greater angles (e.g., $\theta_{NEAR}$) than intermediate distance $D_{INTER}$. Because the far lines of sight 68 are substantially parallel at eye 62 at great distances, less accommodation is used for far distance $D_{FAR}$.

According to an exemplary embodiment, the angle θ may be quantified in units of diopters, where a diopter represents the inverse of the distance (in meters) between object 63 and viewer's eye 62. For lines of sight that are divergent, as in FIG. 6, these lines of sight 64, 66, 68 are referred to as having negative values of diopter. For example, object 63 at a distance of 10 meters from eye 62 is associated with a −0.1 diopter value. Object 63 at a distance of 1 meter is associated with a −1.0 diopter value. Object 63 at a distance of 0.5 meter is associated with a −2.0 diopter value. Thus, object 63 has an increasing negative diopter value as its distance to eye 62 decreases.

As described further below, in order to simulate the focus of the eye, the object distance (e.g., $D_{NEAR}$) is simulated by presenting an image to eye 62 that appears to be at the same distance as the real object. The present invention accomplishes simulation of eye lines of sight divergence by adjusting the focus of an eyepiece lens used in a head mounted display.

Figure 7A:
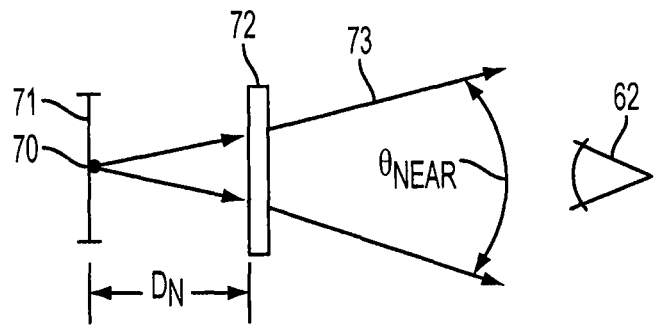
FIGS. 7A, 7B and 7C are side views of an eyepiece lens and a display device of a head borne imaging system, illustrating respective positioning of the eyepiece lens for objects at different distances, in accordance with another embodiment of the present invention.
Figure 7B:
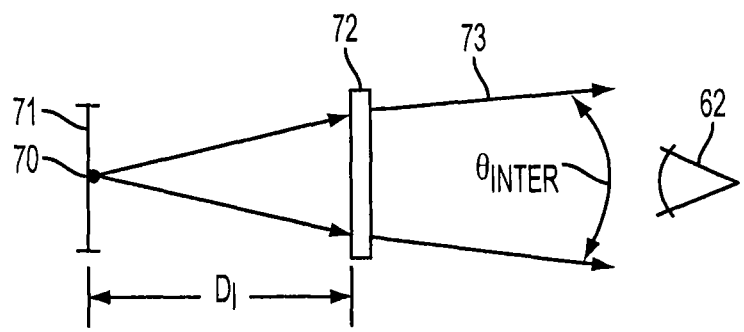
Figure 7C:
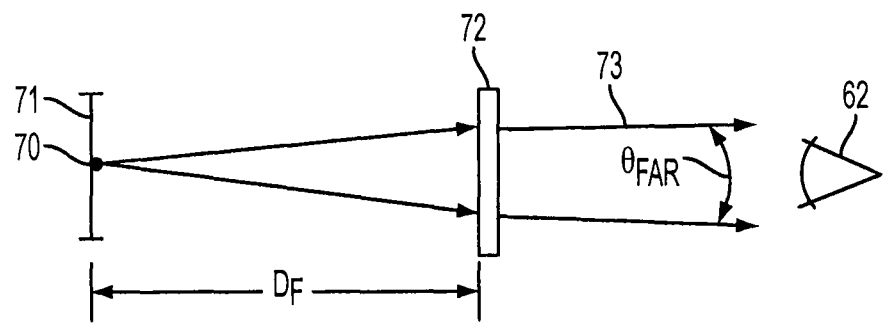

Referring to FIGS. 7A-7C, side views of display device 71 and eyepiece lens 72 of a head borne imaging system are shown, illustrating respective positioning of eyepiece lens 72 for an object at different distances. In particular, FIG. 7A illustrates the position of eyepiece lens 72 relative to display device 71 to simulate the focus of eye 62 for near distance $D_{NEAR}$ (FIG. 6); FIG. 7B illustrates the position of eyepiece lens 72 relative to display device 71 to simulate the focus of eye 62 for intermediate distance $D_{INTER}$ (FIG. 6); and FIG. 7C illustrates the position of eyepiece lens 72 relative to display device 71 to simulate the focus of eye 62 for far distance $D_{FAR}$ (FIG. 6).

In general, eyepiece lens 72 typically includes several lens elements and provides an image to viewer's eye 62 from display device 71. As the distance between display device 71 and eyepiece lens 72 is varied (for example, from $D_N$ to $D_I$ to $D_F$), the angle of rays 73 coming from a single point 70 on display device 71 to viewer's eye 62 varies (for example, from $\theta_{NEAR}$ to $\theta_{INTER}$ to $\theta_{FAR}$, respectively). In FIGS. 7A-7C, distances $D_N$, $D_I$, $D_F$ are selected to simulate the focus of eye 62 for respective distances $D_{NEAR}$, $D_{INT}$, $D_{FAR}$ (FIG. 6) between object 63 and eye 62. Accordingly, eyepiece lens 72 may be focused by varying the distance between display device 71 and eyepiece lens 72.

In FIG. 7A, rays 73 emerging from eyepiece lens 72 have a significant angle ($\theta_{NEAR}$) and simulate observing point 70 at near distance $D_{NEAR}$ (FIG. 6). The relatively large angle $\theta_{NEAR}$ results in a relatively large negative diopter value for this eyepiece focus adjustment. In can be appreciated that an image viewed at angle $\theta_{NEAR}$ may use significant accommodation by the viewer in order to view point 70 in focus. In FIG. 7B, rays 73 emerging from eyepiece lens 72 have a moderate angle ($\theta_{INTER}$) and simulate observing point 70 at intermediate distance $D_{INTER}$ (FIG. 6).

In FIG. 7C, rays 73 emerging from eyepiece lens 72 are substantially parallel with a relatively small angle $\theta_{FAR}$ and simulate observing point 70 at far distance $D_{FAR}$ (FIG. 6). The relatively small angle $\theta_{FAR}$ results in a diopter value near zero. It can be appreciated that an image viewed at angle $\theta_{FAR}$ may use little or no accommodation on the part of the viewer in order to view point 70 in focus. Thus, the overall capability provided by focusing of eyepiece lens 72 may allow the viewer to achieve a desired diopter value for the observed scene on display device 71.

Figure 8:
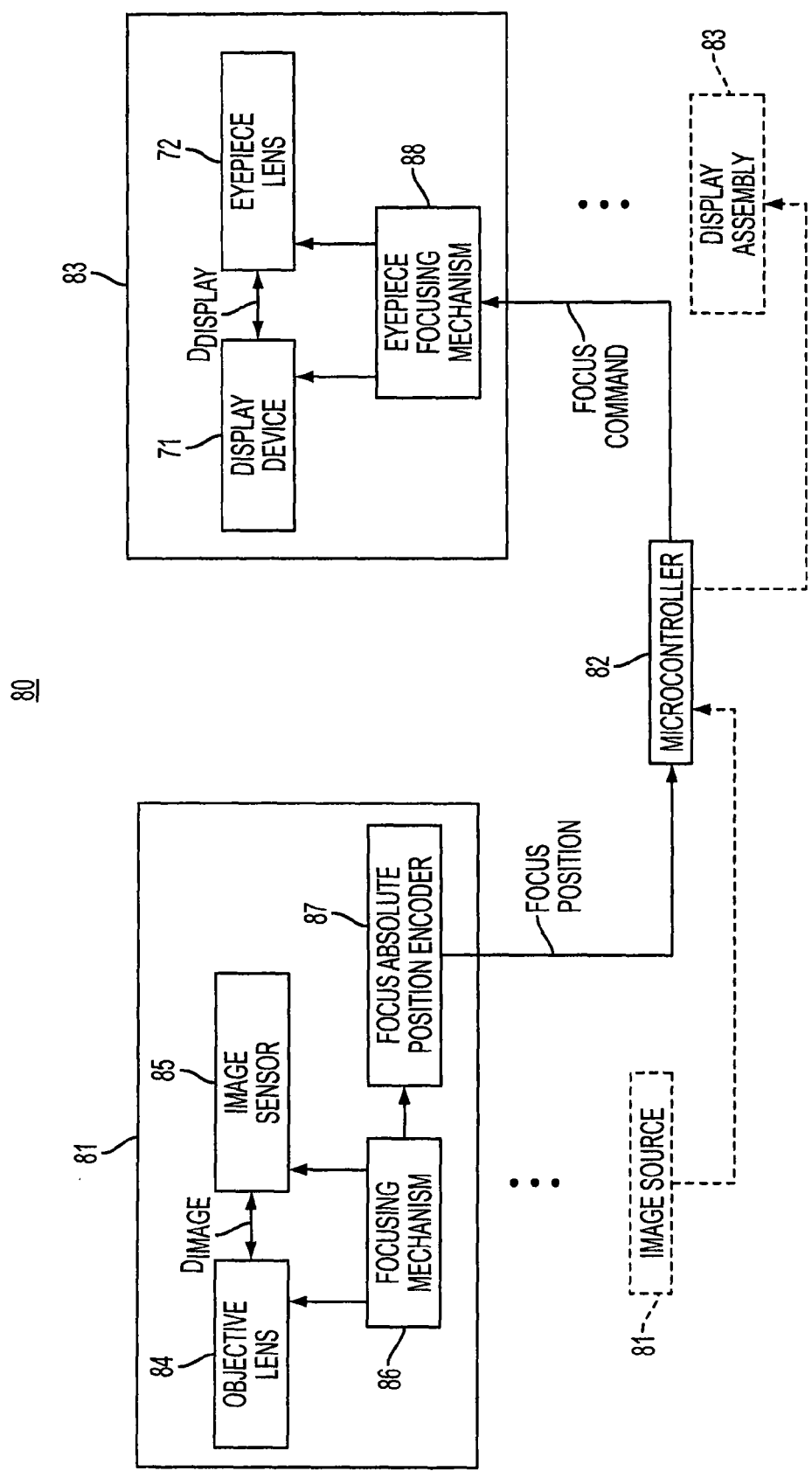
FIG. 8 is a block diagram of a system for viewing image data in a head borne imaging system, in accordance with an embodiment of the present invention.

Referring next to FIG. 8, there is shown a system for viewing image data in a head borne video system, generally designated as 80. System 80 includes image source 81, microcontroller 82 and display assembly 83. Image source 81 provides focus position data to microcontroller 82 and provides image data to display assembly 83. Microcontroller 82 receives the focus position from image source 81 and provides a focus command to adjust a focus of display assembly 83 responsive to the focus position of image source 81.

Image source 81 may include any device capable of providing image data for viewing on display assembly 83. Display assembly 83 may include any display which is configured to be placed about the optical axis of the user's eye. According to one embodiment, image source 81 may be co-located with the optical axis of display assembly 83. According to another embodiment, image source 81 may be offset from display assembly 83.

Although system 80 is discussed below with respect to a single image source 81 and a single display assembly 83, it can be appreciated that system 80 may include one or more image sources 81, which may provide respective image data to one or more display assemblies 83. For example, system 80 may include two display assemblies 83, such as for a pair of binoculars. In this manner, the focus of each visual aid assembly may be individually ganged to the focus of one or more image sources.

Image source 81 includes objective lens 84, image sensor 85, focusing mechanism 86 and focus absolute position encoder 87. Responsive to user input, focusing mechanism 86 adjusts a focus of image source 81, by adjusting a distance, $D_{IMAGE}$, between objective lens 84 and image sensor 85.

Focusing mechanism 86 may receive a focus input from a user via a mechanical input (such as by rotating a shaft via a knob or a lever) or other input signals such as electrical signals (e.g., digital signals or analog signals), radio frequency (RF) signals, optical signals and/or infrared (IR) signals. The input signals may be provided by a wired or wireless connection. According to one embodiment, focusing mechanism 86 may include focus knob 26, described above with respect to FIG. 2. Focusing mechanism 86 may be controlled by a motor (not shown) to allow for a zoom lens operation of image source 81, as described above. Image source 81 may also include a range finder and focus position encoder 87 may include a position sensitive device in order to detect the position of the target, as described above.

Focus position encoder 87 is similar to focus position encoder 21 (FIG. 2) and encodes the orientation of focusing mechanism 86. Focus position encoder 87 includes, but is not limited to a potentiometer, a synchro encoder, a resolver, a magnetic rotary encoder, a magnetic linear encoder, an electro-optical rotary encoder or an electro-optical linear encoder.

Microcontroller 82 may be any type of controller having a processor execution capability provided by a software program stored in a non-transitory computer readable medium, or a hardwired program provided by an integrated circuit. Microcontroller 82 converts the focus position data received from focus position encoder 87 into a focus adjustment for controlling the focus of eyepiece lens 72. The focus adjustment contains a suitable focus position for eyepiece lens 72 to simulate the distance to the real object. Microcontroller 82, thus, uses the focus position data received from focus position encoder 87 to gang the focus of eyepiece lens 72 of display assembly 83 to the focus of image source 81.

According to another embodiment, when image source 81 is offset from display assembly 83, microcontroller 82 may simultaneously provide offset video data (for parallax correction, as described above) to display assembly 83 and adjust the focus of eyepiece lens 72 (for simulating eye lines of sight divergence to the object). In this manner, a single adjustment by the user (e.g., via focusing mechanism 86) will simultaneously provide enhancement of two depth perception cues.

Microcontroller 82 determines an object distance based on the received focus position and generates a focus adjustment for controlling the focus of eyepiece lens 72. Microcontroller 82 may include a microprocessor or a field programmable gate array (FPGA) device that has been programmed with a suitable algorithm to determine the object distance and/or generate the eyepiece lens focus adjustment.

The focus adjustment value may be determined, for example, from a look-up table (LUT), based on predetermined focus positions. For example, multiple predetermined focus positions may be determined using diopter values of an unaided eye. Accordingly, known diopter measures for the unaided eye to focus on objects at various distances may be used to determine the predetermined focus adjustments in the LUT. Thus, responsive to the focus position data received from focus position encoder 87, microcontroller 82 may select one of the predetermined focus positions as the focus adjustment. The manner in which microcontroller 82 adjusts the focus of eyepiece lens 72 is described further below. The focus adjustment is provided by microcontroller 82 as part of a focus command to eyepiece focusing mechanism 88 of display assembly 83.

Display assembly 83 includes eyepiece focusing mechanism 88, display device 71 and eyepiece lens 72. Eyepiece focusing mechanism 88 receives the focus command having the focus adjustment value from microcontroller 82 and adjusts the focus position of eyepiece lens 72 relative to display device 71. It will be appreciated that eyepiece focusing mechanism 88 may be any focusing mechanism configured to adjust the focus position of eyepiece lens 72 relative to display device 71. For example, eyepiece focusing mechanism 88 may include an electro-mechanical device, an opto-mechanical device or an objective feedback sensor and a low power motor to drive eyepiece lens 72 and/or display device 71 responsive to the focus command. The focus command contains a specific eyepiece lens-to-image display distance, $D_{DISPLAY}$, as the focus adjustment value, which is implemented by eyepiece focusing mechanism 88. The resulting diopter value of the eyepiece focus positioning (via $D_{DISPLAY}$) is such that it simulates the light ray divergence from the actual object that was focused on by objective lens 84.

According to an exemplary embodiment, eyepiece focusing mechanism 88 may include suitable electronic logic or analog circuitry to compare the focus adjustment value with the actual position of eyepiece lens 72 (relative to display device 71), a feedback transducer (not shown) to provide the actual position of eyepiece lens 72 relative to display device 71, and a motor (not shown) for adjusting the distance $D_{DISPLAY}$ between display device 71 and eyepiece lens 72. Examples of adjusting the focus of eyepiece lens 72 relative to display device 71 are described further below with respect to FIGS. 9A-12B.

In operation, system 80 uses the position of focusing mechanism 86 to determine the distance to the user's object of interest. Microcontroller 82 determines an appropriate amount of focus adjustment corresponding to the focal distance of the object of interest, to provide a natural line of sight divergence of the object to the user's eye. For example, when microcontroller 82 determines that the focal distance to the object is a near distance, for example, $D_{NEAR}$ shown in FIG. 6, eyepiece focusing mechanism 88 (responsive to microcontroller 82) adjusts the distance $D_{DISPLAY}$ to a diopter value to simulate the eye lines of sight from this near object. When image source 81 is focused on a distant object, for example, $D_{FAR}$ shown in FIG. 6, eyepiece focusing mechanism 88 adjusts the distance $D_{DISPLAY}$ to a diopter value to be near infinity focus.

According to another embodiment, system 80 may also apply an appropriate amount of parallax correction to the image shown on the display device 71, based on the distance to the object of interest. For example, if image source 81 is offset from an optical axis of display assembly 83, microcontroller 82 may simultaneously apply a parallax correction to the image data and adjust distance $D_{DISPLAY}$ between display device 71 and eyepiece lens 72, to simulate the focus of the user's eye to an object at different focal distances. It may be appreciated that the system of the present invention allows for a single adjustment by the user (via focusing mechanism 86) to simultaneously compensate for parallax and the divergence of lines of sight of the eye, to provide enhanced depth perception.

Figure 9A:
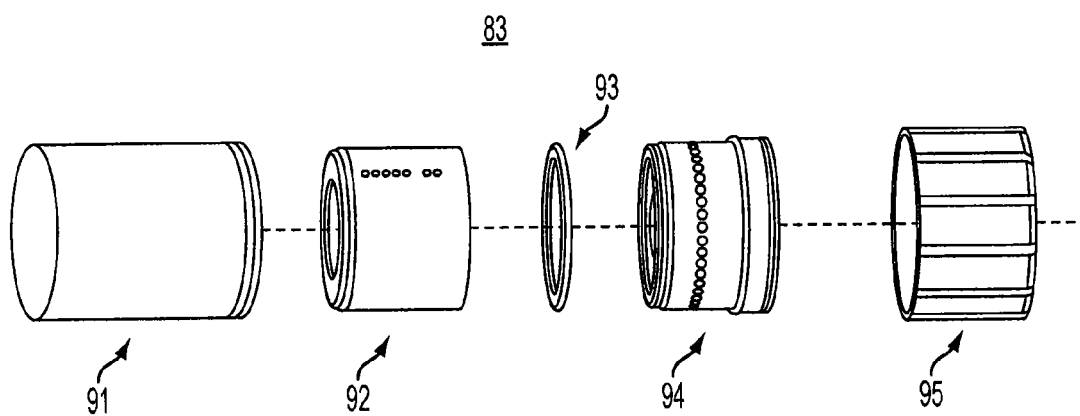
FIGS. 9A and 9B are an exploded perspective view and a cross sectional view, respectively, of a display assembly of the system shown in FIG. 8, in accordance with an embodiment of the present invention.
Figure 9B:
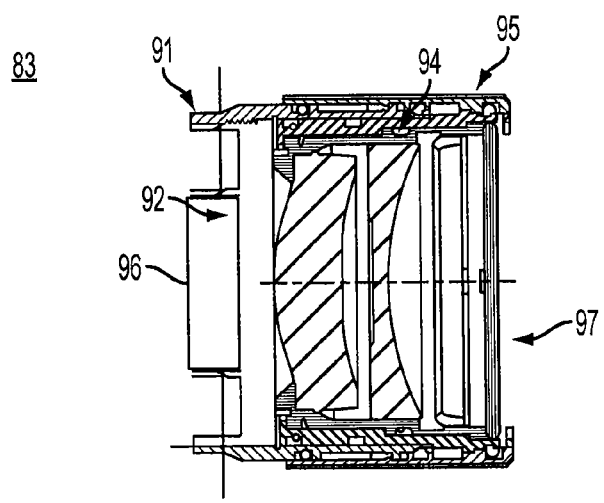

Referring next to FIGS. 9A and 9B, display assembly 83 is shown, according to an embodiment of the present invention. In particular, FIGS. 9A and 9B are an exploded perspective view and a cross sectional view, respectively, of display assembly 83 including visual aid body 91, display device assembly 92 having display device 96, ring 93, eyepiece lens assembly 94 having eyepiece lenses 97 and focusing collar 95. Display device 96 and eyepiece lenses 97 correspond to display device 71 and eyepiece lens 72 of FIG. 8, respectively.

Visual Aid Body 91 houses display device assembly 92 and eyepiece lens assembly 94. Ring 93 provides separation between display device 96 and eyepiece lenses 97 of eyepiece lens assembly 94. In operation, focusing collar 95 is used to move eyepiece lens assembly 94 with respect to display device assembly 92 and visual aid body 91, to adjust distance $D_{DISPLAY}$ (FIG. 8), and adjust the eyepiece diopter value.

Display device 96 provides a surface upon which an image appears, which is focused by eyepiece lenses 97 and viewed by the user. As shown in FIGS. 9A and 9B, display device 96 represents a night vision image tube. It will be appreciated that display device assembly 92 may include other types of display devices 96, including, but not limited to, electronic displays (e.g., liquid crystal displays (LCDs), organic light emitting diode (OLED) displays, cathode ray tube (CRT) displays, electroluminescent displays (ELDs)), transparent reticles, or displays which provides an aerial image formed by a relay lens.

Eyepiece lens assembly 94 includes a series of lens elements, designated generally as eyepiece lenses 97, and may include one or more optical filters (not shown) that are physically integrated into opto-mechanical eyepiece lens assembly 94. Eyepiece lens assembly 94 may be cylindrical in shape, as shown in FIGS. 9A and 9B, but may also include other non-cylindrical shapes, such as the rectilinear shape shown in FIGS. 11A and 11B.

Focusing Collar 95 illustrates a threaded focusing mechanism. In this example, a male and female threaded pair are used as the mechanism for providing continuous, linear positioning of eyepiece lenses 97 with respect to display device 96. One of these threaded components may be fixed to visual aid body 91, such that the mating part on focusing collar 95 is free to rotate with respect to visual aid body 91. The process of rotation results in linear translation of a component, along the axis of rotation. For example, eyepiece lenses 97 are translated with respect to display device 96. According to one embodiment, eyepiece lenses 97 may rotate during the focusing translation action. According to another embodiment, eyepiece rotation may be prevented by an anti-rotation pin, such that rotation by focusing collar 95 results in linear translation of eyepiece lenses 97.

Figure 10A:
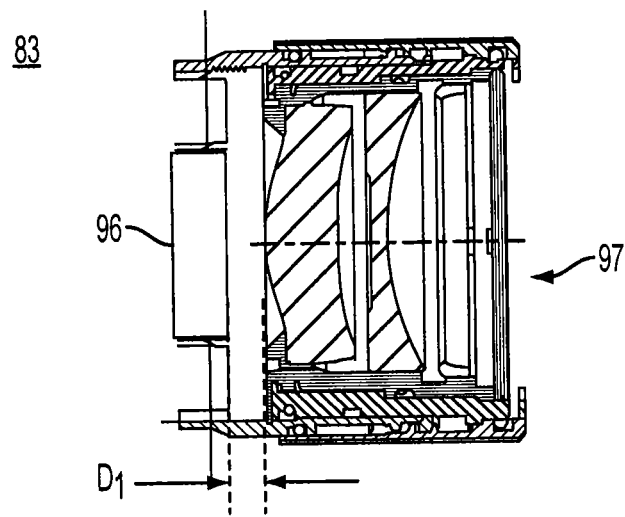
FIGS. 10A and 10B are cross section views of the display assembly shown in FIG. 9B, illustrating respective positioning of the eyepiece lens for objects at different distances.
Figure 10B:
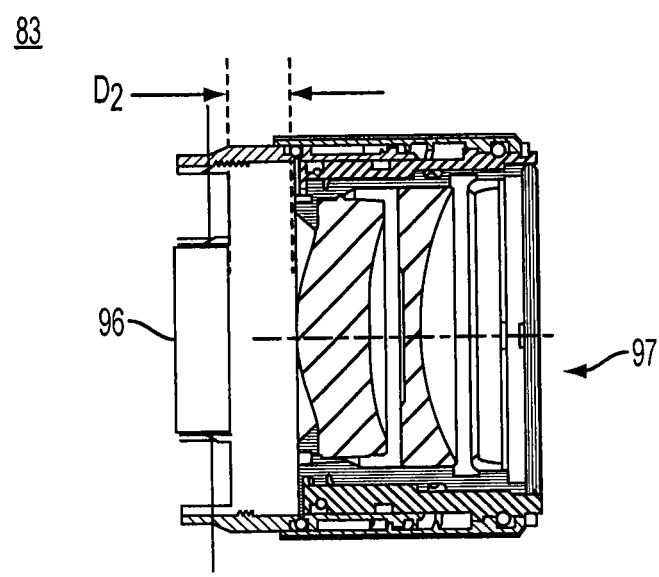

FIGS. 10A and 10B are cross section views of display assembly 83, illustrating respective positioning of the eyepiece lens assembly 94 for objects at two different distances. FIGS. 10A and 10B illustrate two focus positions (i.e., different diopter settings) using the display assembly 83 shown in FIGS. 9A and 9B.

FIG. 10A illustrates a relatively small distance, $D_1$, between eyepiece lenses 97 and display device 96. Distance $D_1$ corresponds to a more negative diopter measurement at the user's eye position. FIG. 10B illustrates a relatively larger distance, $D_2$, between eyepiece lenses 97 and display device 96. Distance $D_2$ corresponds to a more positive diopter measurement at the user's eye position.

Figure 11A:
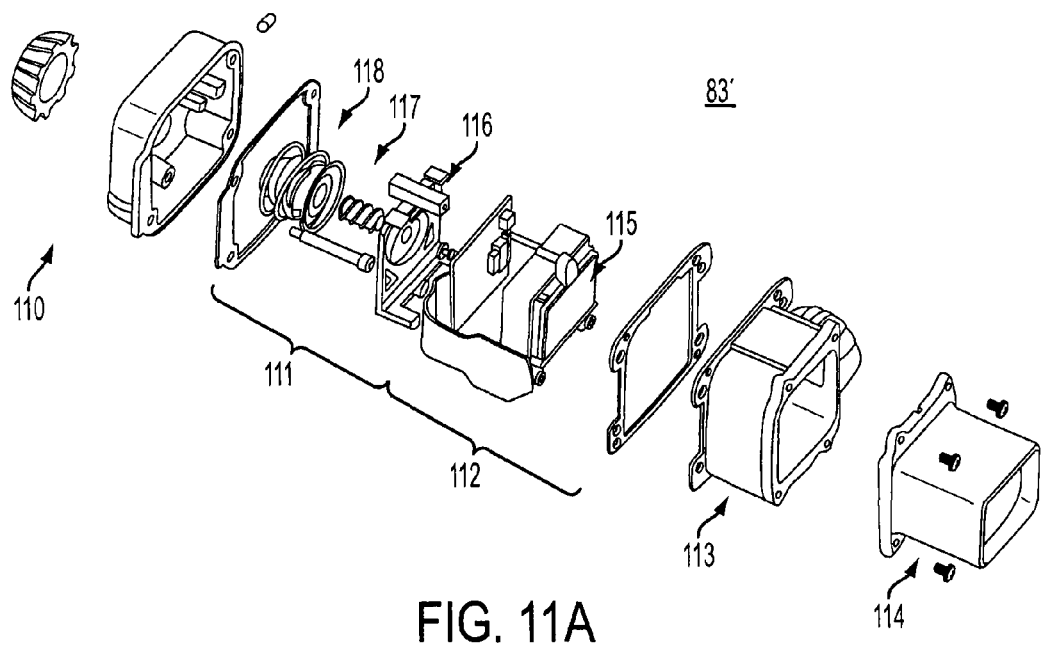
FIGS. 11A and 11B are an exploded perspective view and a cross sectional view, respectively, of a display assembly of the system shown in FIG. 8, in accordance with another embodiment of the present invention.
Figure 11B:
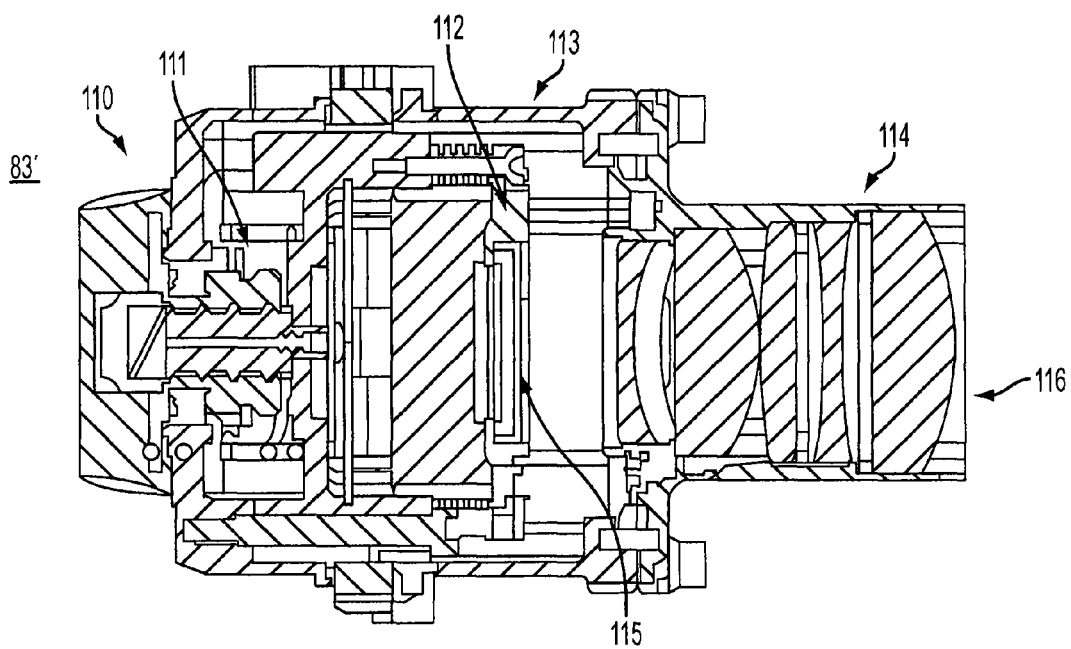

Referring to FIGS. 11A and 11B, display assembly 83' is shown, according to another embodiment of the present invention. In particular, FIGS. 11A and 11B are an exploded perspective view and a cross sectional view, respectively, of display assembly 83' including housing 110, focusing mechanism 111, display device assembly 112 having display device 115, housing 113 and eyepiece lens assembly 114 having eyepiece lenses 116. Display device 115 and eyepiece lenses 116 correspond to display device 71 and eyepiece lens 72 of FIG. 8, respectively.

Housing 110 and housing 113 are used to house focusing mechanism 111 and display device assembly 112. Eyepiece lens assembly 114 is coupled to housing 113. In operation, focusing mechanism 111 is used to move display device assembly 112 with respect to eyepiece lens assembly 114, to adjust distance $D_{DISPLAY}$ (FIG. 8), and adjust the eyepiece diopter value.

Focusing mechanism 111 translates display device 115 with respect to eyepiece lenses 116. Focusing mechanism 111 includes structure 116 that holds display device 115 and threaded mechanism 117 that implements a translation motion responsive to rotation of focus knob 118. Although not shown, focus knob 118 may be driven by an actuator, such as focus position encoder 87 (FIG. 8), responsive to the focus command.

In FIGS. 11A and 11B, display device 115 represents a LCD video display. Display device 115 is similar to display device 96 (FIGS. 9A and 9B), and may include any of the type of display devices described above with respect to display device 96.

Eyepiece lens assembly 114 includes components similar to eyepiece lens assembly 94, namely a series of eyepiece lenses, designated generally as eyepiece lenses 116, and may include may include one or more optical filters (not shown) that are physically integrated into opto-mechanical eyepiece lens assembly 114. Eyepiece lens assembly 114 may be rectilinear in shape, as shown in FIGS. 11A and 11B, but may also include other non-rectilinear shapes, such as the cylindrical shape shown in FIGS. 9A and 9B.

Figure 12A:
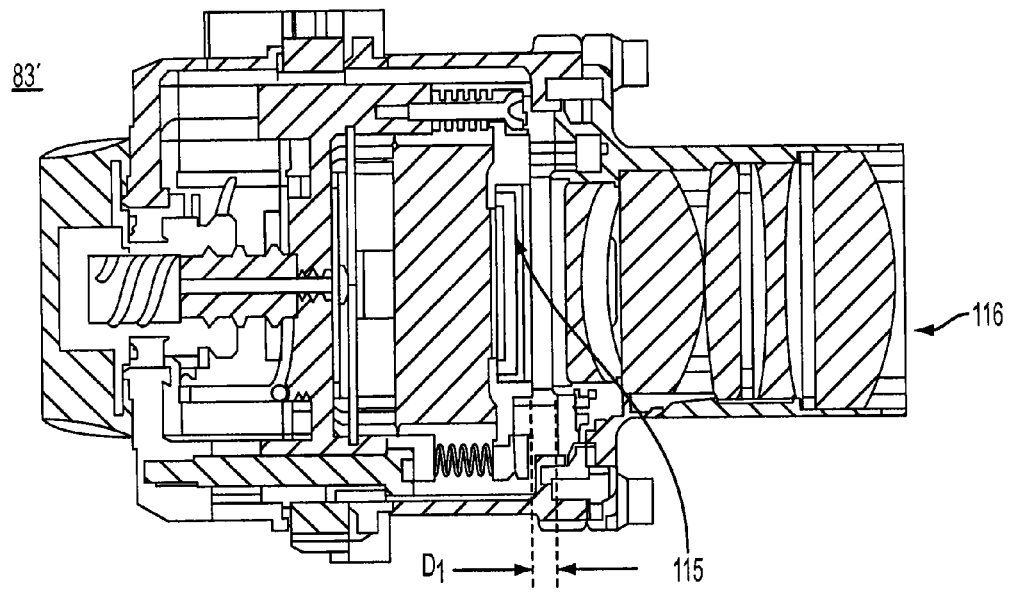
FIGS. 12A and 12B are cross section views of the display assembly is shown in FIG. 11B, illustrating respective positioning of the display device for objects at different distances.
Figure 12B:
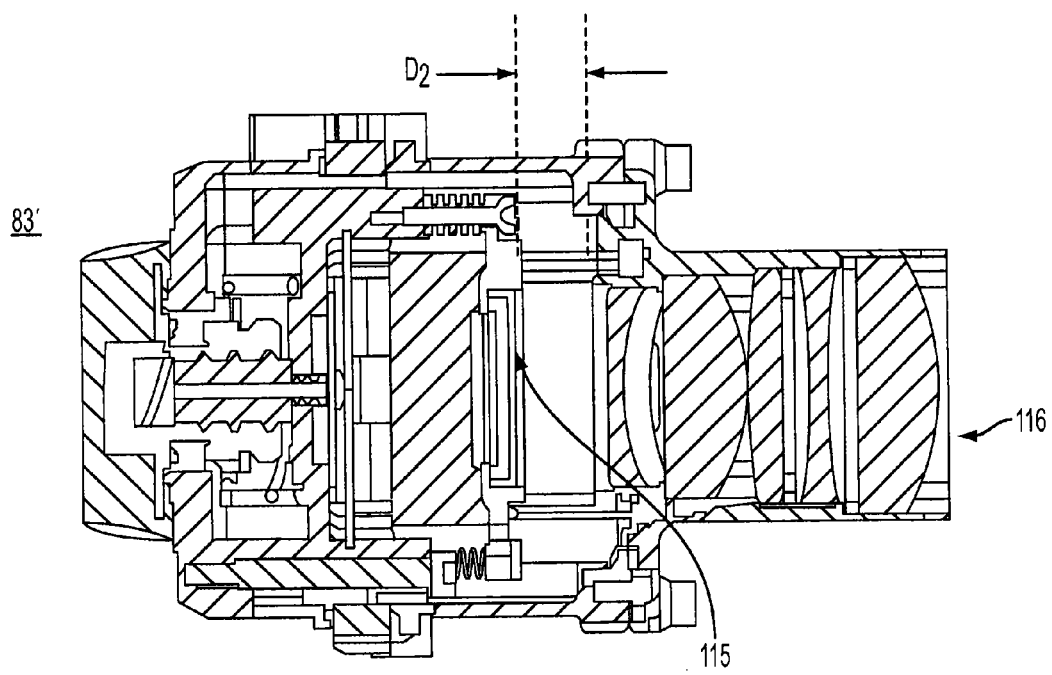

FIGS. 12A and 12B are cross section views of display assembly 83', illustrating respective positioning of the display device assembly 112 for objects at two different distances. FIGS. 12A and 12B illustrate two focus positions (i.e., different diopter settings) using the display assembly 83' shown in FIGS. 11A and 11B.

FIG. 12A illustrates a relatively small distance, $D_1$, between eyepiece lenses 116 and display device 115. Distance $D_1$ corresponds to a more negative diopter measurement at the user's eye position. FIG. 12B illustrates a relatively larger distance, $D_2$, between eyepiece lenses 116 and display device 115. Distance $D_2$ corresponds to a more positive diopter measurement at the user's eye position.

The embodiments described above may be used by any head borne camera system, including a head mounted night vision goggle and a head mounted reality mediator device.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A system for viewing image data comprising:
a head borne image source for imaging an object and providing the image data wherein the head borne image source is configured to image the object along a first axis;
an eyepiece lens assembly configured to provide an image along a second axis, wherein the second axis is parallel to and displaced from the first axis by a distance D; and
a display device for receiving the image data and displaying the image data to a user's eye via the eyepiece lens assembly, a controller for determining, from the distance D and from a focus position of the head borne image source:
a focus adjustment of the eyepiece lens assembly,
a target distance between the eyepiece lens assembly and the display,
a displacement of the image data displayed on the display device to compensate for a parallax resulting from the displacement of the second axis from the first axis and divergence of lines of sight to objects at different distances; and
an adjustment of the displacement of the image data displayed on the display device based on the distance D and the determined focus adjustment.

2. The system of claim 1, wherein
the focus adjustment simulates a divergence of a user's eye lines of sight to the object associated with a distance to the object.

3. The system of claim 1, including
a focusing mechanism disposed between the controller, the display device and the eyepiece lens assembly, for receiving the focus adjustment and adjusting the distance between the eyepiece lens assembly and the display device.

4. The system of claim 1, wherein
the controller determines a distance to the object from the focus position and determines the focus adjustment and the displacement of the image data from a look-up table (LUT) using the distance.

5. The system of claim 4, wherein
the focus adjustment includes a diopter value corresponding to the distance to the object.

6. The system of claim 4, including:
a focus position encoder coupled to the controller for determining the distance to the object imaged by the head borne image source.

7. The system of claim 1, wherein
the eyepiece lens assembly is stationary and the display device is moved relative to the eyepiece lens assembly responsive to the focus adjustment.

8. The system of claim 1, wherein
the display device is stationary and the eyepiece lens assembly is moved relative to the display device responsive to the focus adjustment.

9. The system of claim 1, wherein
the display device and the eyepiece lens assembly are included in a helmet mounted display (HMD).

10. The system of claim 1, wherein
the display device, the eyepiece lens assembly and the image source are part of a head mounted night vision goggle.

11. The system of claim 1, wherein
the display device and eyepiece lens assembly are configured for placement directly in front of the user's eye as a vision aid, and the head borne image source is configured for placement to a side of the user's eye, displaced from the first axis by the distance D.

12. In a head borne camera system having an image source, a display device and an eyepiece lens assembly, wherein the image source is configured to receive an image of a scene along a first axis and the eyepiece lens assembly is configured to provide an image along a second axis, parallel to and displaced from the first axis by a distance D, a method of viewing image data comprising the steps of:
 (a) imaging an object in the scene, by the image source, to provide the image data;
 (b) determining a focus adjustment based on a focus position of the image source;
 (c) adjusting the focus of the eyepiece lens assembly and a distance between the eyepiece lens assembly and the display device based on the focus adjustment determined in step (b);
 (d) adjusting a displacement of the image data to be displayed on the display device based on the distance D and the focus adjustment determined in step (b); and
 (e) displaying the image data to a user's eye by the display device via the eyepiece lens assembly, responsive to steps (c) and (d).

13. The method of claim 12, wherein
the focus adjustment simulates a divergence of a user's eye lines of sight to the object associated with a distance to the object.

14. The method of claim 12, wherein
step (b) includes determining a focus distance to the object based on the focus position of the image source and determining the focus adjustment and the displacement of the image data from a look-up table (LUT) using the focus distance.

15. The method of claim 14, wherein
the focus adjustment includes a diopter value corresponding to the distance to the object.

16. The method of claim 12, wherein
the eyepiece lens assembly is stationary and step (b) includes moving the display device relative to the eyepiece lens assembly responsive to the focus adjustment.

17. The method of claim 12, wherein
the display device is stationary and step (b) includes moving the eyepiece lens assembly relative to the display device responsive to the focus adjustment.

* * * * *